US008917599B2

(12) United States Patent
Flinta et al.

(10) Patent No.: US 8,917,599 B2
(45) Date of Patent: Dec. 23, 2014

(54) SYSTEMS AND METHODS FOR CONTROLLING DATA TRANSMISSION RATES

(75) Inventors: Christofer Flinta, Stockholm (SE); Jan-Erik Mångs, Solna (SE); Bob Melander, Sigtuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 610 days.

(21) Appl. No.: 13/133,762

(22) PCT Filed: Dec. 10, 2008

(86) PCT No.: PCT/IB2008/003419
§ 371 (c)(1),
(2), (4) Date: Aug. 17, 2011

(87) PCT Pub. No.: WO2010/067138
PCT Pub. Date: Jun. 17, 2010

(65) Prior Publication Data
US 2011/0292800 A1   Dec. 1, 2011

(51) Int. Cl.
| H04L 12/24 | (2006.01) |
| H04L 12/801 | (2013.01) |
| H04L 12/851 | (2013.01) |
| H04L 12/825 | (2013.01) |
| H04L 12/841 | (2013.01) |
| H04L 12/861 | (2013.01) |

(52) U.S. Cl.
CPC ............ *H04L 47/10* (2013.01); *H04L 47/2441* (2013.01); *H04L 47/25* (2013.01); *H04L 47/28* (2013.01); *H04L 49/90* (2013.01)
USPC ........................ 370/235; 370/252; 370/395.42

(58) Field of Classification Search
CPC ..... H04L 47/10; H04L 47/32; H04L 12/5695; H04L 47/12; H04L 47/22; H04L 47/2441; H04L 47/263; H04L 49/254; H04W 28/22; H04W 72/1242; H04W 72/1263; H04W 72/1278; H04W 2213/13522
USPC ........... 370/229, 230, 230.1, 235, 235.1, 252, 370/254, 255, 395.42
See application file for complete search history.

(56) References Cited

U.S. PATENT DOCUMENTS

| 7,864,678 B1 * | 1/2011 | Sampath et al. ............... 370/232 |
| 2004/0177087 A1 * | 9/2004 | Wu et al. ........................ 707/102 |

FOREIGN PATENT DOCUMENTS

| EP | 1187404 A2 | 3/2002 |
| WO | 2004004275 A1 | 1/2004 |

* cited by examiner

*Primary Examiner* — Yemane Mesfin
*Assistant Examiner* — Mon Cheri Davenport
(74) *Attorney, Agent, or Firm* — Rothwell, Figg, Ernst & Manbeck P.C.

(57) ABSTRACT

The present application discloses systems and methods for adapting the rate at which the packets are transmitted. In one embodiment, the method includes: (a) receiving a packet; (b) determining whether the packet is high priority packet or a low priority packet; and (c) determining whether a transmission rate value, which defines the maximum rate or maximum average rate at which the node should transmit the low priority packets, should be adjusted, wherein the determination is based, at least in part, on whether at least some number of high priority packets and/or bits was received since a point in time; and (d) adjusting the transmission rate value if it is determined in step (c) that the transmission rate value should be adjusted.

14 Claims, 7 Drawing Sheets

SYSTEMS AND METHODS FOR CONTROLLING DATA TRANSMISSION RATES

CROSS-REFERENCE TO RELATED APPLICATION

This application is a 35 U.S.C. §371 National Phase Entry Application from PCT/IB2008/003419, filed Dec. 10, 2008, and designating the United States.

TECHNICAL FIELD

The present invention relates to systems and methods for controlling data transmission rates.

BACKGROUND

A gateway (e.g., a residential gateway (RGW) or other communication device) is computer that connects a first network (e.g., a local area network (LAN)) to a second network (e.g., a wide area network (WAN)). That is, the gateway functions to receive traffic from a device connected to the first network and retransmit the traffic to a device connected to the second network and vice-versa.

Traffic received at a gateway may consist of two types: (1) high-priority (HP) traffic (e.g. Internet Protocol (IP) television traffic (IPTV), IP telephony, etc.) and (2) low-priority (LP) traffic (e.g. transmission control protocol (TCP) packets). Since HP traffic is sensitive to delay and packet loss, it is generally desirable to guarantee a specific bandwidth for HP traffic (e.g., to guarantee that the gateway will retransmit HP traffic at a certain rate at least). LP traffic, on the other hand, generally does not require a guaranteed bandwidth. One way to guarantee a specific bandwidth for HP traffic is to dedicate certain gateway resources (e.g., a certain amount of gateway bandwidth) to HP traffic such that these dedicated resources can not be used by LP traffic. A problem with this solution is that it is inefficient when the rate at which HP traffic arrives at the gateway is less than bandwidth dedicated to the HP traffic. This is inefficient because a portion of the dedicated bandwidth would go unused.

What is desired are improved systems and methods for controlling data transmission rates.

SUMMARY

In one aspect, the invention provides a method for adapting the rate at which the packets are transmitted. In some embodiments, this method includes the following steps: (a) receiving a packet; (b) determining whether the packet is high priority packet or a low priority packet; and (c) determining whether a transmission rate value, which defines the maximum rate or maximum average rate at which the node should transmit the low priority packets, should be adjusted, wherein the determination is based, at least in part, on whether at least some number of high priority packets and/or bits was received since a point in time; (d) adjusting the transmission rate value if it is determined in step (c) that the transmission rate value should be adjusted; and (e) using a transmitter to transmit a set of low priority packets, wherein a rate at which the set of low priority packets is transmitted is a function of the transmission rate value.

In some embodiments, the step of determining whether the transmission rate value should be adjusted comprises determining that the transmission rate value should be increased if less than a threshold number of high priority packets and/or bits have been received since the point in time and the transmission rate value is set to a first predetermined value, and the step of adjusting the transmission rate value comprises setting the transmission rate value to a second predetermined value in response to the determination that the transmission rate value should be increased, wherein the first predetermined value is less than the second predetermined value.

In some embodiments, the step of determining whether the transmission rate value should be adjusted comprises determining that the transmission rate value should be decreased if at least a threshold number of high priority packets and/or bits have been received since the point in time and the transmission rate value is set to a second predetermined value, and the step of adjusting comprises setting the transmission rate value to the first predetermined value in response to the determination that the transmission rate value should be decreased. In some embodiments, the threshold number equals one.

In some embodiments, the step of determining whether the transmission rate value should be adjusted comprises determining that the transmission rate value should be increased if less than a threshold number of high priority packets and/or bits have been received since the point in time and if the transmission rate value can be increased by a first predetermined amount without violating a restriction (e.g., in some embodiments, the transmission rate value can be increased by the first predetermined amount without violating a restriction if the transmission rate value is less than some upper threshold limit by at least the first predetermined amount), and the step of adjusting the transmission rate value comprises increasing the transmission rate value by the first predetermined amount in response to the determination that the transmission rate value should be increased.

In some embodiments, the step of determining whether the transmission rate value should be adjusted further comprises determining that the transmission rate value should be decreased if at least the threshold number of high priority packets and/or bits have been received since the point in time and if the transmission rate value can be decreased by a second predetermined amount without violating a restriction (e.g., in some embodiments, the transmission rate value can be decreased by the second predetermined amount without violating a restriction if the transmission rate value is greater than some lower threshold limit by at least the second predetermined amount), and the step of adjusting the transmission rate value comprises decreasing the transmission rate value by the second predetermined amount in response to the determination that the transmission rate value should be decreased. In some embodiments, the second predetermined amount is greater than or equal to the first predetermined amount. In some embodiments, the threshold number is a function of a guaranteed rate associated with the high priority packets. In other embodiments, the threshold number is a function of the guaranteed rate and a margin or margin factor value. In some embodiments, the threshold number is equal to (a) the guaranteed rate minus the margin value or (b) the guaranteed rate divided by the margin factor value.

In another aspect, the present invention provides a communication device configured to receive both high priority packets and low priority packets and to transmit those packets. In some embodiments, the communication device includes: a receiver for receiving packets; a packet classifier for determining whether a received packet is a high priority packet; a transmission rate setting module configured to (a) increase a transmission rate value, which defines the maximum rate or maximum average rate at which the communication device should transmit the low priority packets, in response to determining or receiving an indication that a first set of one or more criteria is met and (b) decrease the transmission rate value in response to determining or receiving an indication that a second set of one or more criteria is met; and a packet transmitter configured to transmit low priority packets in accordance with the transmission rate value, wherein the transmission rate setting module is configured to determine whether the second set of criteria is met by determining whether the number of high priority packets and/or bits received since a point in time is at least the threshold value or is greater than the threshold value.

In some embodiments, the transmission rate setting module is configured to set the transmission rate value to a first predetermined value in response to determining or receiving an indication that the number of high priority packets and/or bits received since the point in time is less than the threshold value. In some embodiments, the transmission rate setting module is configured to set the transmission rate value to a second predetermined value in response to determining that the number of high priority packets and/or bits received since the point in time is not less than the threshold value, and the first predetermined value is greater than the second predetermined value. The threshold equals one in some embodiments.

In some embodiments, the transmission rate setting module is configured to increase the transmission rate value by a first predetermined amount in response to determining that (a) the transmission rate value can be increased by the first predetermined amount without violating a restriction and (b) the number of high priority packets and/or bits received since the point in time is less than the threshold value. In some embodiments, the transmission rate setting module is configured to decrease the transmission rate value by a second predetermined amount in response to determining that (a) the transmission rate value can be decreased by the second predetermined amount without violating a restriction and (b) the number of high priority packets and/or bits received since the point in time is greater than the threshold value.

In some embodiments, the transmission rate setting module is configured to periodically determine whether the number of high priority packets and/or bits received since a point in time is less than a threshold value. The transmission rate setting module may be configured to determine the number of high priority packets and/or bits received since a point in time by counting the number of high priority packets and/or bits received between the point in time and another point in time, wherein the point in time and the another point in time define a window of time.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
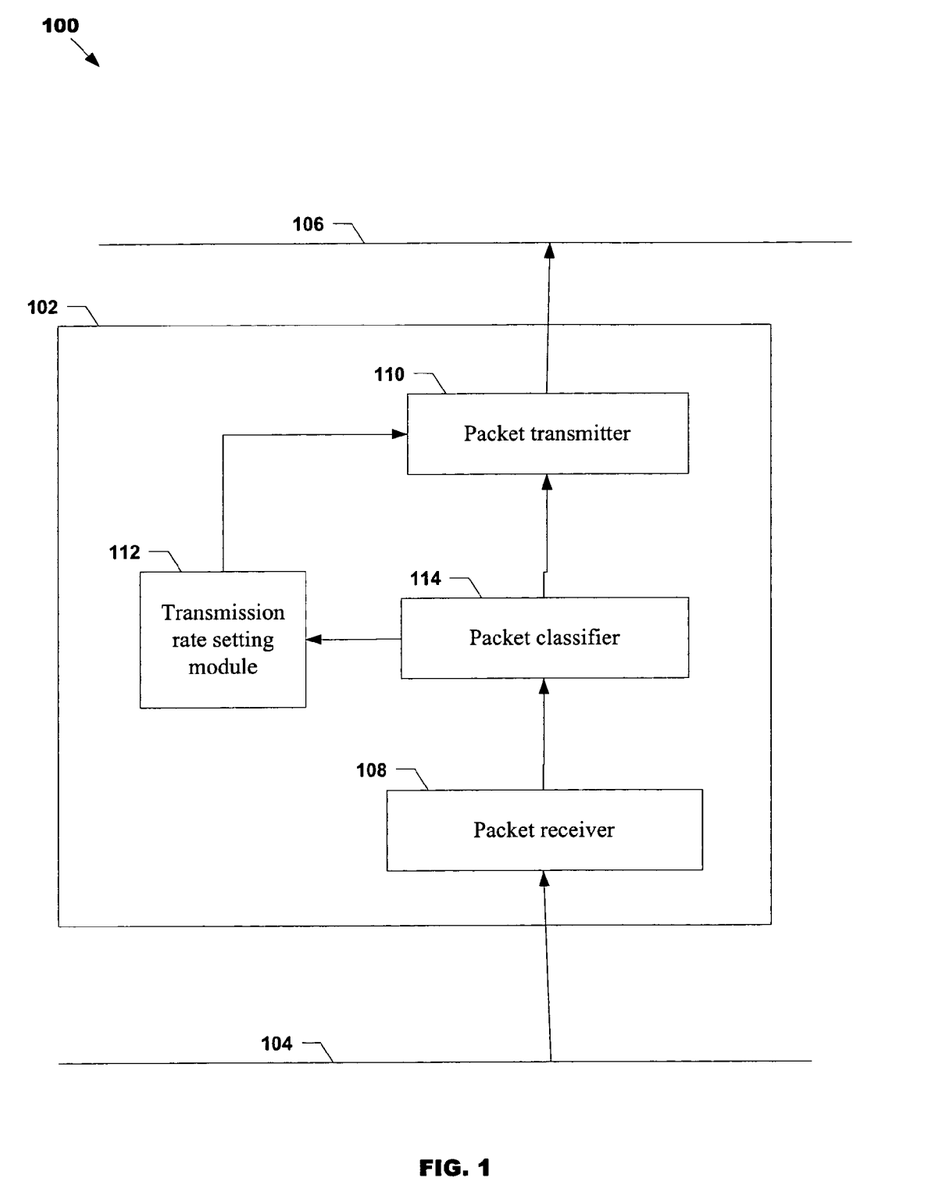
FIG. 1 is a functional block diagram of a network node according to some embodiments of the invention.

Referring now to FIG. 1, FIG. 1 illustrates a network node 102 (e.g., a gateway, such as a residential gateway (RGW), or other node) according to an embodiment of the invention. In the embodiment illustrated, node 102 is connected to a first network 104 (a.k.a., "access network" 104) and to a second network 106 (a.k.a., "home network" 106). Node 102 has a receiver 108 for receiving packets or frames (hereafter "packets" for simplicity) from network 104 and a transmitter 110 for transmitting the received packets onto network 106.

In the embodiment shown, node 102 has a transmission rate setting module 112 and packet classifier for categorizing a packet as either an HP packet or a LP packet. In some embodiments, an HP packet is defined as any packet that contains a user datagram protocol (UDP) protocol data unit and an LP packet is defined as any packet that is not an HP packet. The invention, however, is not limited to any particular definition of HP/LP packet. Transmission rate setting module 112 is configured to adaptively set transmission rate limits. For example, transmission rate setting module 112 may be configured to adaptively set a transmission rate lower limit for HP packets and/or a transmission rate upper limit for LP packets based on, for example, the current traffic pattern arriving at node 102. The transmission rate limit may be an average transmission rate limit or a maximum/minimum transmission rate limit. Packet transmitter 110 is configured to transmit packets according to the transmission rate limit(s) set by module 112. Because module 112 is configured to adapt (e.g., automatically adjust) a transmission rate limit based on, for example, the traffic arriving at node 102, the likelihood that available bandwidth would go unused for an appreciable period of time is decreased.

Figure 2:
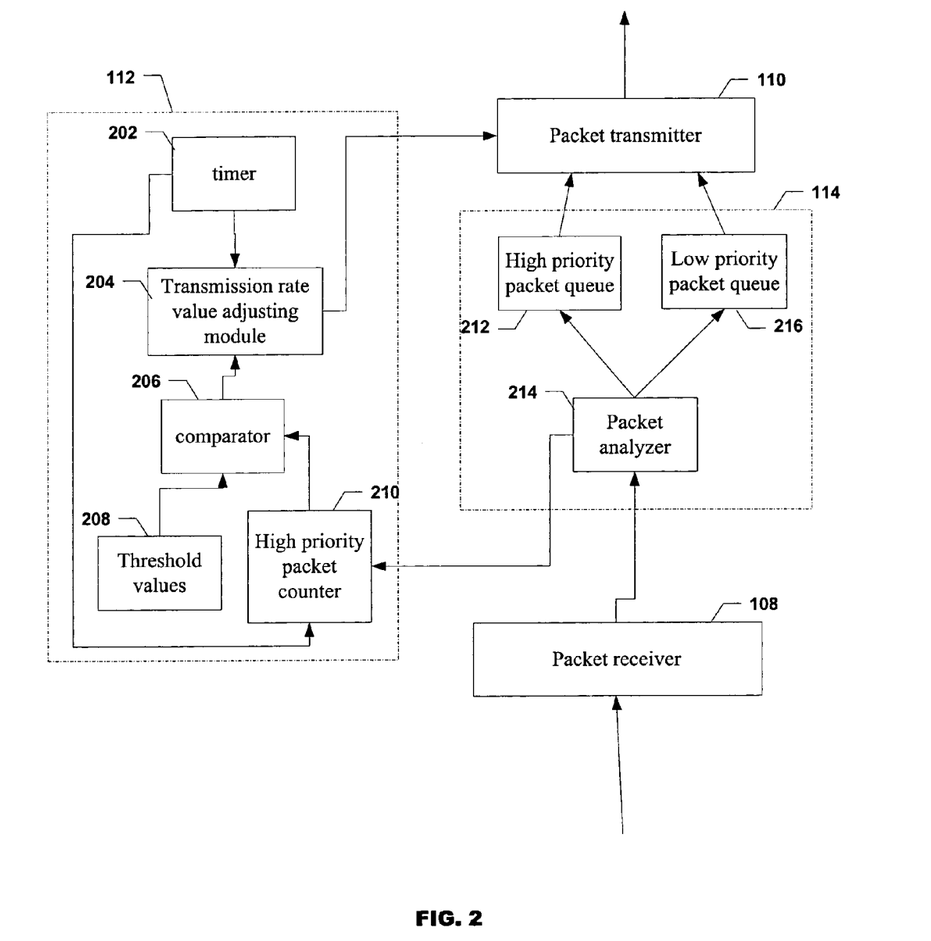
FIG. 2 is a functional block diagram of the network node according to some embodiments of the invention.

Referring now to FIG. 2, FIG. 2 illustrates modules 112 and 114 according to some embodiments. As illustrated in FIG. 2, packet classifier module 114 may include a packet analyzer 214, an HP packet queue 212 and a LP packet queue 216. Packet analyzer 214 is configured to analyze each incoming packet to determine whether the incoming packet is an HP packet or an LP packet. As illustrated, analyzer 214 places HP packets in queue 212 and places LP packets in queue 216.

As further illustrated in FIG. 2, transmission rate setting module 112 may include an HP packet counter 210, a comparator 206, a transmission rate value adjusting module 204, and a timer 202. HP packet counter 210 may be configured to keep a count of the number of HP packets received and/or the number of HP packet bits received. Timer 202 is configured to keep track of time so that packet/bit rates can be determined. For example, timer 202 may be used to reset HP packet counter 210 periodically (e.g., every second). Comparator 206 may be configured to compare the number of HP packets/bits received as indicated by counter 210 to a threshold value 208, and signal module 204 depending on the result of the comparison. For example, if comparator 206 determines that the number of HP packets/bits exceeds a threshold, then comparator 206 may signal module 204, which may use this information to adjust the rate at which packet transmitter 110 transmits HP packets. As a specific example, transmitter 110 may transmit LP packets based on a token bucket algorithm and module 204 may adjust the rate at which "tokens" are added to the "bucket" by, for example, decreasing the rate at which tokens are added to the bucket when the number of HP packets/bits exceeds a threshold. It should be noted that the threshold need not be a constant but can be a function of a rate value set by module 204.

Figure 3:
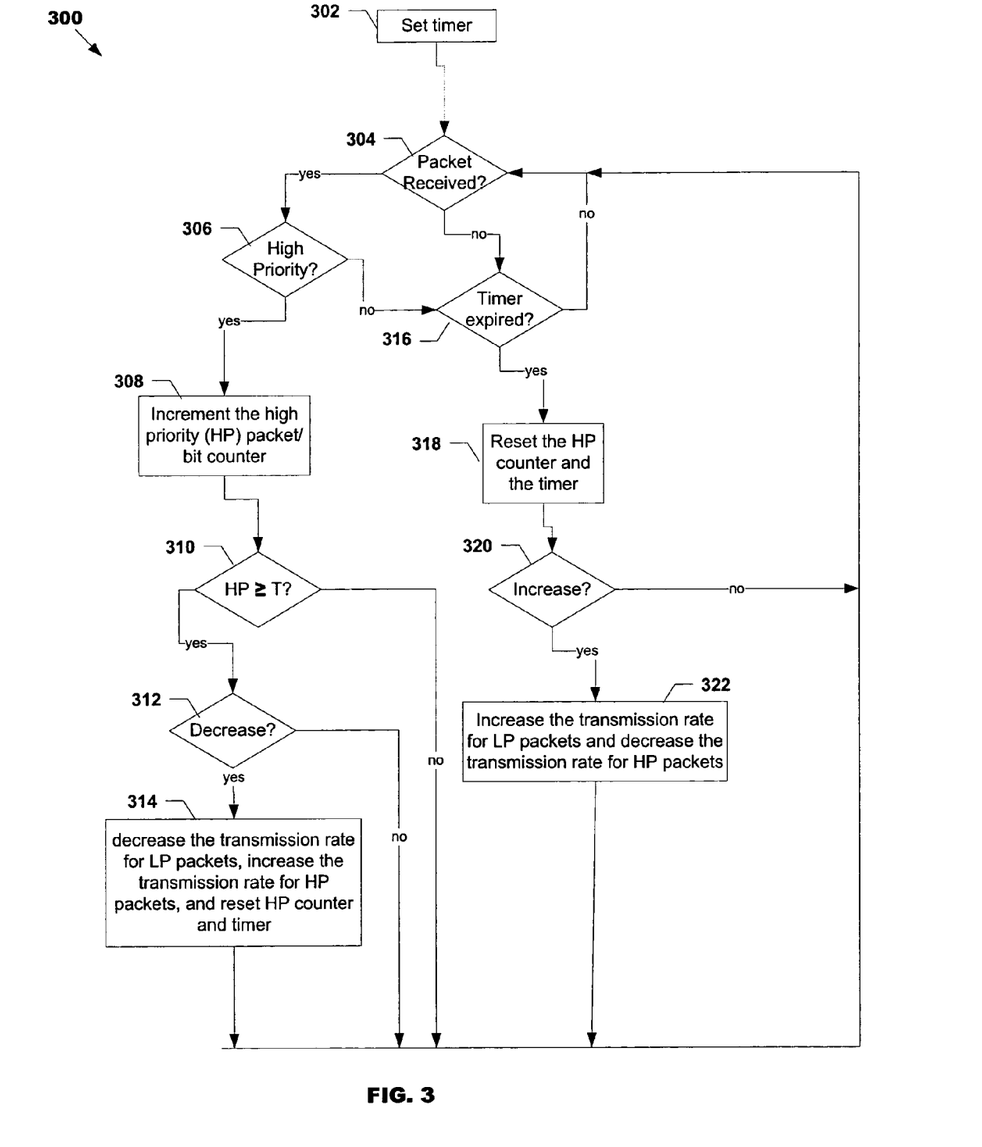
FIGS. 3-5 are flow charts illustrating processes according to some embodiments of the invention.

Referring now to FIG. 3, FIG. 3 is a flow chart illustrating a process 300 performed by node 102 for setting HP/LP transmission rate values. Process 300 may begin in step 302, where timer 202 is set to expire in t seconds (t>0). In step 304, node 102 determines whether a packet has been received. If so, the process proceeds to step 306, otherwise it proceeds to step 316. In step 306, packet analyzer 214 determines whether the packet is an HP packet. If it is, the process proceeds to step 308, otherwise it proceeds to step 316.

In step 308, counter 210 increments a value or vector ("HP") that represents the number of HP packets and/or bits received since a particular point in time. Next (step 310), comparator 206 determines whether HP is equal to or greater than a threshold (T). If HP equals or exceeds the threshold, then the process proceeds to step 312, otherwise it proceeds back to step 304. In step 312, module 204 determines whether a transmission rate value ("LP-TRV"), which defines the maximum rate or maximum average rate at which transmitter 110 should transmit LP packets, can be decreased. For example, in step 312, module 204 may determine whether LP-TRV is currently greater than some value. If in step 312, module 204 determines that LP-TRV can be decreased, the process proceeds to step 314, otherwise it goes back to step 304.

In step 314, module 204 decreases LP-TRV by some amount (e.g., a predetermined amount), increases a transmission rate value that defines the minimum rate or minimum average rate at which transmitter 110 should transmit HP packets ("HP-TRY") by, for example, the amount at which LP-TRV was decreased, sets HP equal to zero, and resets timer 302 so that it expires after t seconds. HP-TRV is also referred to as a guaranteed rate. After step 314, process 300 proceeds back to step 304.

In step 316, module 204 determines whether timer 202 has expired. If it has, process 300 proceeds to step 318, otherwise it proceeds back to step 304. In step 318, module 204 sets HP equal to zero and resets timer 302 so that it expires after t seconds. Next (step 320), module 204 determines whether LP-TRV can be increased. For example, in step 320, module 204 may determine whether LP-TRV is currently less than some value. If in step 302, module 204 determines that LP-TRV can be increased, the process proceeds to step 322, otherwise it goes back to step 304. In step 322, module 204 increases LP-TRV by some amount (e.g., a predetermined amount) and decreases HP-TRV by, for example, the amount at which LP-TRV was increased. After step 322, process 300 proceeds back to step 304.

Figure 4:
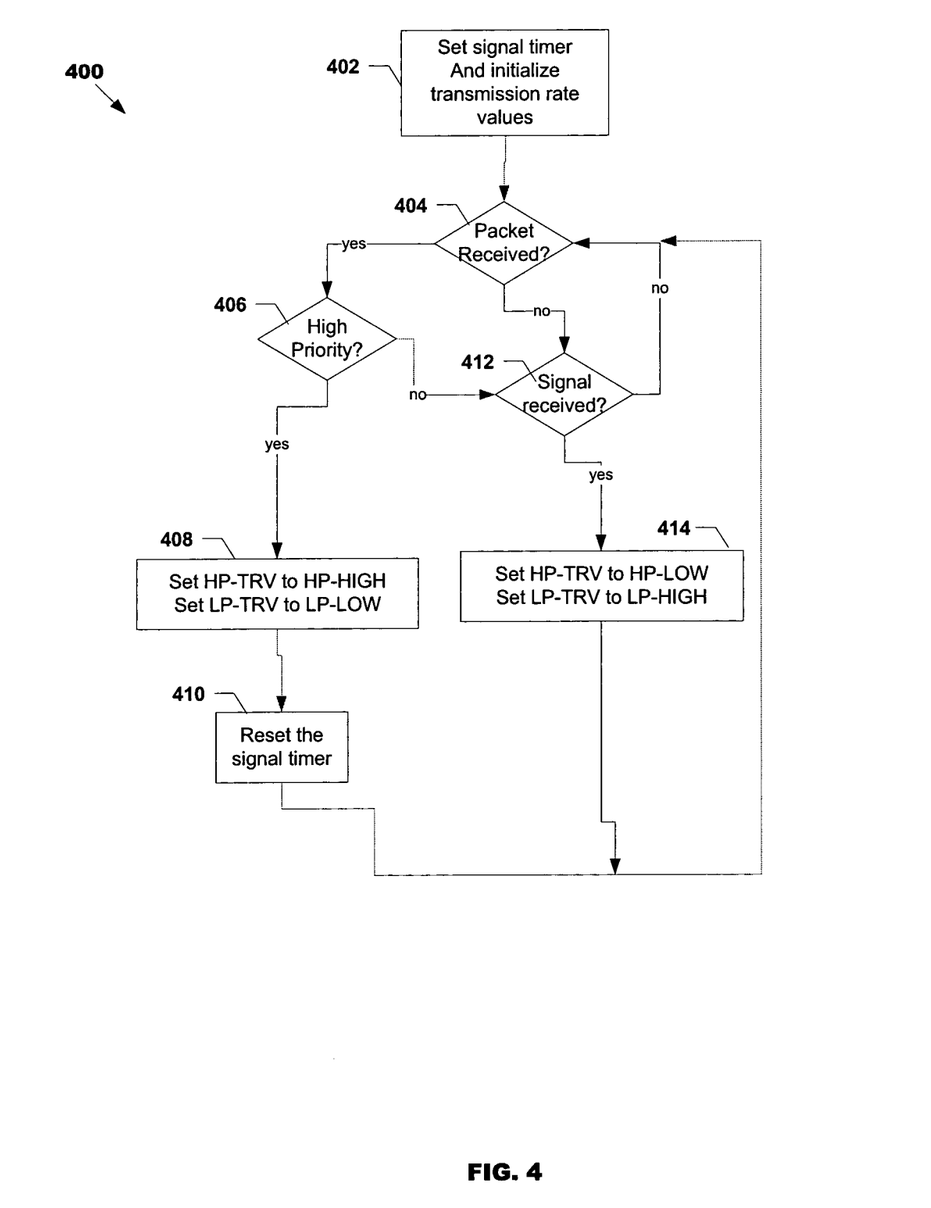

In the above manner, the LP-TRV and HP-TRV are adapted based on the rate at which HP traffic is arriving at node 102. Accordingly, the likelihood that available bandwidth would go unused decreases. For example, this is illustrated in FIG. 6. As shown in FIG. 6, LP-TRV is the diameter of LP pipe 604 and HP-TRV is the diameter of HP pipe 602. By implementing process 300, the diameters of pipes 602 and 604 may change based on the rate at which HP packets arrive at node 102 via access link 104. For example, in some embodiments, LP-TRV may be set to a first value ("LP-HIGH") if no HP packets arrive at the node within t seconds of time and may be set to a second value ("LP-LOW") if at least one HP packet arrives at node within the t seconds, where LP-HIGH>LP-LOW. This embodiment is further illustrated in 4. In another embodiment, LP-TRV may be increased by an increment ("D") if less than a threshold number of HP bits is received within t seconds. This embodiment is further illustrated in FIG. 5.

Referring now to FIG. 4, FIG. 4 is a flow chart illustrating a process 400 performed by node 102 for setting HP/LP transmission rate values. Process 400 may begin in step 402, where timer 202 is configured to generate a signal after t seconds elapses and transmission rate values (e.g., HP-TRV and LP-TRV) are initialized. For example, in step 402 t may be set to 1 second and HP-TRV may be set to HP-HIGH and LP-TRV may be set to LP-LOW. Next (step 404), node 102 determines whether a packet has been received. If so, the process proceeds to step 406, otherwise it proceeds to step 412. In step 406, packet analyzer 214 determines whether the packet is an HP packet. If it is, the process proceeds to step 408, otherwise it proceeds to step 412. In step 408, HP-TRV is set to HP-HIGH and LP-TRV is set to LP-LOW. Next (step 410), node 102 resets timer 202 to generate a signal after t seconds elapses. When timer 202 generates the signal, process 400 proceeds to step 414. In step 414, HP-TRV is set to HP-LOW and LP-TRV is set to LP-HIGH. Preferably, HP-HIGH>HP-LOW, LP-HIGH>LP-LOW and HP-HIGH>LP-HIGH.

As a result of implementing process 400, LP-TRV is set to LP-HIGH and HP-TRV is set to HP-LOW if no HP packet is received within a t second window. As soon as an HP packet arrives, LP-TRV is set to LP-LOW and HP-TRV is set to HP-HIGH. If, after the HP packet arrives, no there is a t second window in which no HP packet is received, then HP-TRV is set back to HP-LOW and LP-TRV is set back to LP-HIGH and the process repeats. In this manner, transmission rate values are adapted based on the HP traffic pattern.

Figure 5:
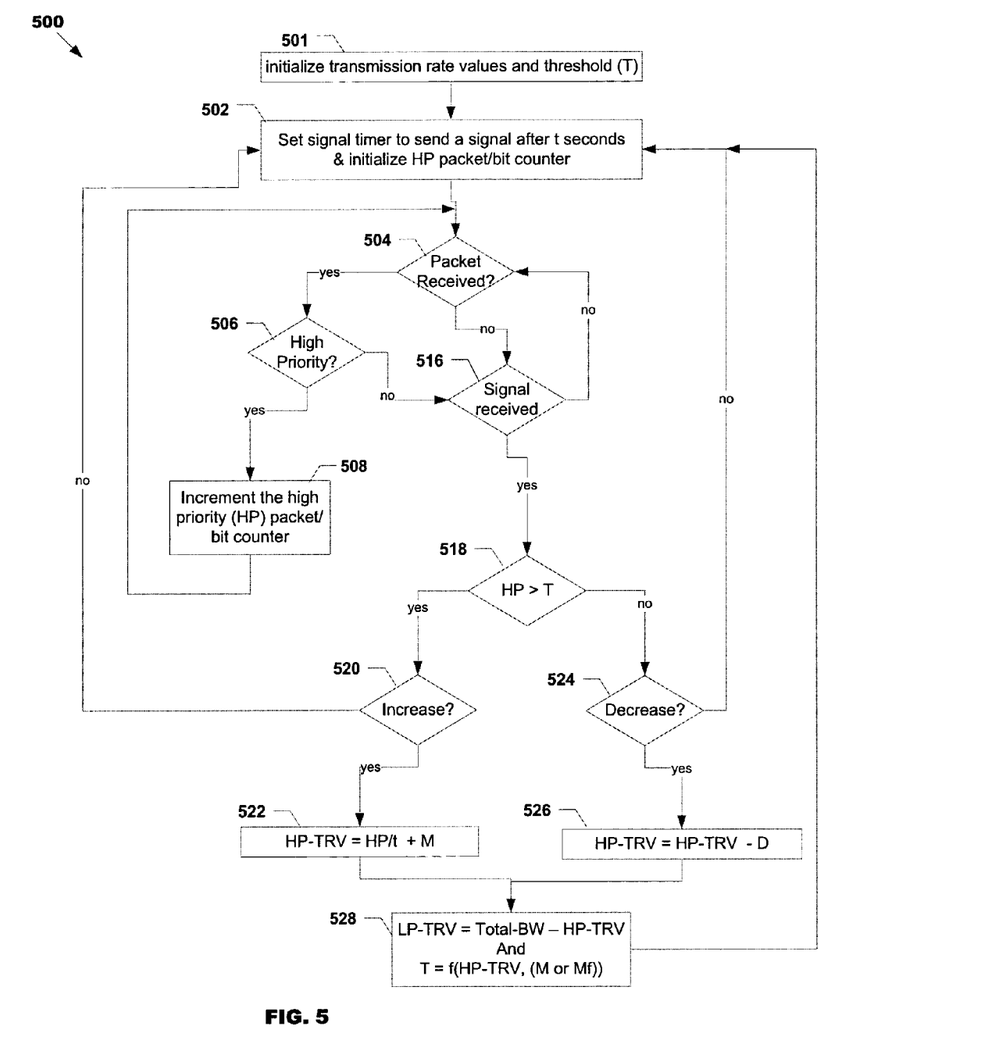
Figure 6:
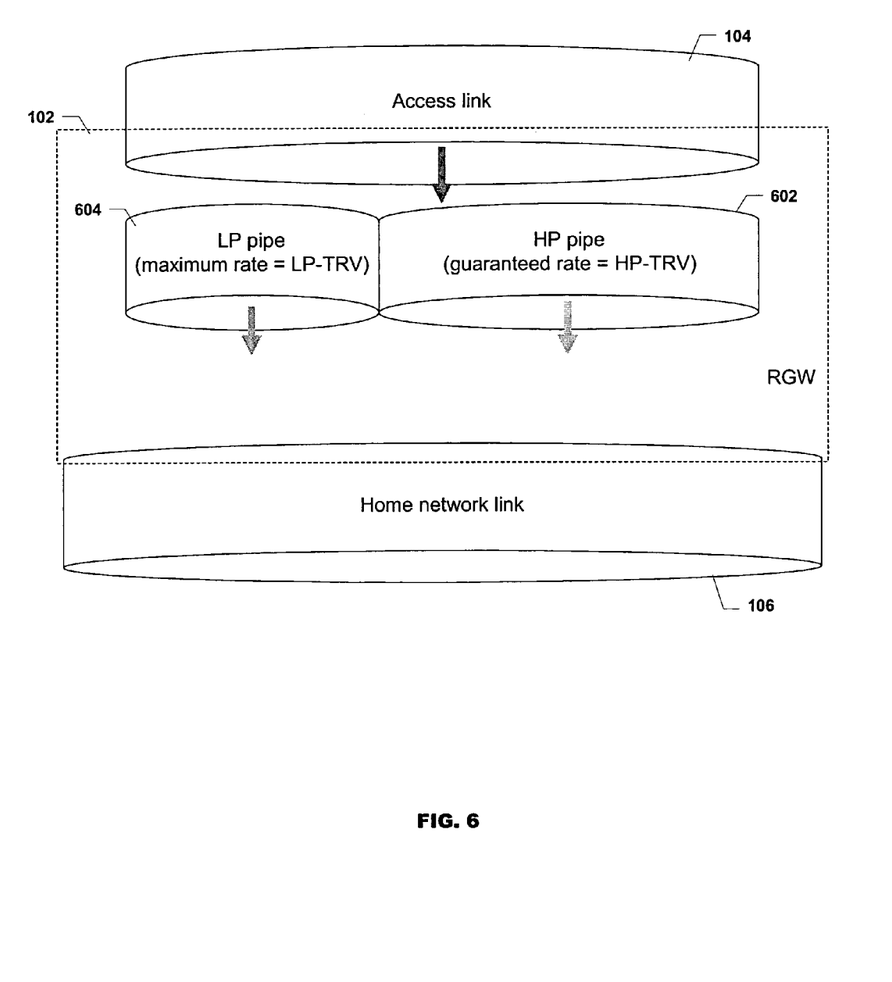
FIG. 6 is an illustration of a gateway that provides more resources to HP traffic than LP traffic.

Referring now to FIG. 5, FIG. 5 is a flow chart illustrating a process 500 performed by node 102 for setting HP/LP transmission rate values. Process 500 may begin in step 501, where HP-TRV and LP-TRV are initialized and a threshold value (T) is initialized. In some embodiments, T is a function of HP-TRV and a margin (M) or a margin factor (Mf), (i.e., T=f(HP-TRV, M) or T=f(HP-TRV, Mf)). For example, in some embodiments T is set such that T=HP-TRV−M. In other embodiments T may equal HP-TRV/Mf or HP-TRV*Mf.

In step 502, timer 202 is configured to generate a signal after t seconds elapses since being activated and is activated, and a high priority packet or bit counter ("HP") is initialized (e.g., HP=0). In step 504, node 102 determines whether a packet has been received. If so, the process proceeds to step 506, otherwise it proceeds to step 516. In step 506, packet analyzer 214 determines whether the packet is an HP packet. If it is, the process proceeds to step 508, otherwise it proceeds to step 516. In step 508, HP is incremented. For example, if the HP value keeps track of the number of HP bits received, then in step 508, HP is incremented by the number of HP bits included in the HP packet that was received. After step 508, the process goes back to step 504.

When timer 202 generates the signal indicating that t seconds has elapsed since the timer was activated, process 500 proceeds to step 518. In step 518, comparator 206 determines whether HP>T. If HP>T, then the process proceeds to step 520, otherwise it proceeds to step 524.

In step 520, module 204 determines whether HP-TRV can be increased. For example, module 204 determines whether HP-TRV is less than a certain value (e.g., the total available bandwidth minus a margin). If HP-TRV can be increased, then HP-TRV is set such that HP-TRV=HP/t+M (step 522). In step 524, module 204 determines whether HP-TRV can be decreased. For example, module 204 determines whether HP-TRV is greater than a certain value. If HP-TRV can be decreased, then HP-TRV is set such that HP-TRV=HP-TRV−D, where D may be a constant (step 526) and is referred to as a "downstep." Next (step 528) LP-TRV is set such that LP-TRV=Total-BW−HP-TRV, where Total-BW is the maximum transmission rate of transmitter 110, and T is set to a function of HP-TRV and M or Mf, as described above with reference to step 501. After step 528, the process proceeds back to step 502.

As a result of implementing process 500, HP-TRV generally follows the rate at which HP bits are received at node 102. Thus, as the rate at which HP bits are received at node 102 decreases, LP-TRV increases. Thus, the likelihood decreases that bandwidth resources will go unused when there is little HP traffic, but much LP traffic.

Figure 7:
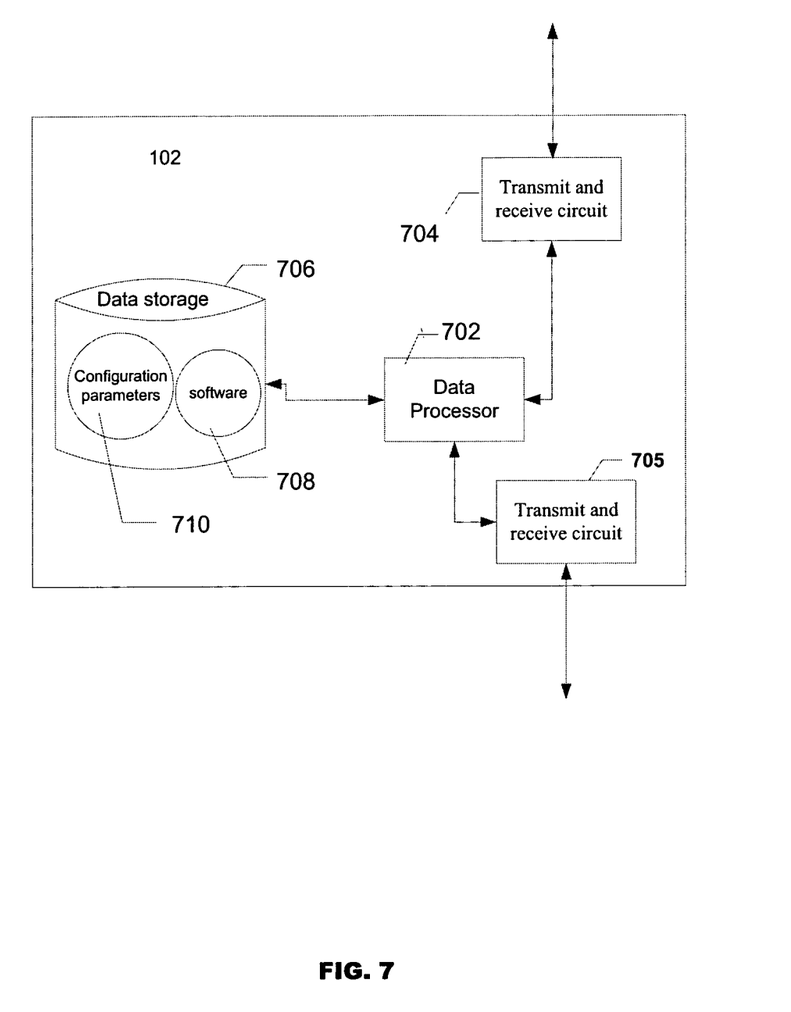
FIG. 7 is a functional block diagram of the network node according to some embodiments of the invention.

Referring now to FIG. 7, FIG. 7 is a functional block diagram of node 102 according to some embodiments of the invention. As shown, node 102 may comprise a data processing system 702 (e.g., one or more microprocessors), a data storage system 706 (e.g., one or more non-volatile storage devices) and computer software 708 stored on the storage system 706. Configuration parameters 710 (e.g., the above mentioned thresholds) may also be stored in storage system 706. Node 102 also includes transmit/receive (Tx/Rx) circuitry 704 for transmitting data to and receiving data from network 104 and transmit/receive (Tx/Rx) circuitry 705 for transmitting data to and receiving data from network 110.

Software 708 is configured such that when processor 702 executes software 708, node 102 performs steps described above with reference to FIG. 3, 4 or 5. For example, software 708 may include: (1) computer instructions configured to determine whether a received packet is a high priority packet; (2) computer instructions (e.g., a transmission rate setting module) configured to (a) increase a transmission rate value, which defines the maximum rate or maximum average rate at which the communication device should transmit the low priority packets, in response to determining or receiving an indication that a first set of one or more criteria is met and (b) decrease the transmission rate value in response to determining or receiving an indication that a second set of one or more criteria is met. The transmission rate setting module may include computer instructions for determining whether the second set of criteria is met by determining whether the number of high priority packets received since a point in time is at least the threshold value or is greater than the threshold value.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. In a node that is configured to receive both high priority packets and low priority packets and to transmit those packets, a method for adapting the rate at which the packets are transmitted, the method comprising:
   (a) initializing a counter, wherein the counter represents the number of high priority packets and/or bits that have been received since a point in time;
   (b) setting a transmission rate value to a first predetermined value, wherein the transmission rate value defines a maximum transmission rate or maximum average transmission rate for the low priority packets;
   (c) receiving a packet;
   (d) examining the packet to determine whether the packet is a high priority packet or a low priority packet;
   (e) if the packet is a high priority packet, then incrementing the counter;
   (f) determining whether the transmission rate value should be adjusted, wherein the determining step comprises comparing said counter to a threshold value;
   (g) adjusting the transmission rate value if it is determined in step (f) that the transmission rate value should be adjusted; and
   (h) using a transmitter to transmit a set of low priority packets, wherein a rate at which the set of low priority packets is transmitted is a function of the transmission rate value, wherein:
   the step of determining whether the transmission rate value should be adjusted comprises determining that the transmission rate value should be increased if the counter is less than the threshold value and if the transmission rate value can be increased by a first predetermined amount without violating a restriction;
   the step of adjusting the transmission rate value comprises increasing the transmission rate value by the first predetermined amount in response to the determination that the transmission rate value should be increased;
   the threshold value is a function of a guaranteed rate, associated with the high priority packets, and a margin value or a margin factor value; and
   the threshold value is equal to (a) the guaranteed rate minus the margin value, (b) the guaranteed rate divided by the margin factor value, or (c) the guaranteed rate multiplied by the margin factor value.

2. The method of claim 1, wherein:
   the step of adjusting the transmission rate value comprises setting the transmission rate value to a second predetermined value in response to the determination that the transmission rate value should be increased, wherein the first predetermined value is less than the second predetermined value.

3. The method of claim 1, wherein:
   the step of determining whether the transmission rate value should be adjusted comprises determining that the transmission rate value should be decreased if the counter is greater than the threshold value; and
   the step of adjusting comprises setting the transmission rate value to a second predetermined value in response to the determination that the transmission rate value should be decreased, wherein the first predetermined value is greater than the second predetermined value.

4. The method of claim 2, wherein the threshold value equals one.

5. The method of claim 1, wherein:
   the step of determining whether the transmission rate value should be adjusted further comprises determining that the transmission rate value should be decreased if the counter is greater than the threshold value and if the transmission rate value can be decreased by a second predetermined amount without violating a restriction; and
   the step of adjusting the transmission rate value comprises decreasing the transmission rate value by the second predetermined amount in response to the determination that the transmission rate value should be decreased.

6. The method of claim 5, wherein the second predetermined amount is greater than or equal to the first predetermined amount.

7. The method of claim 6, wherein the second predetermined amount is greater than the first predetermined amount.

8. A communication device configured to receive both high priority packets and low priority packets and to transmit those packets, the communication device comprising:
- a receiver for receiving packets;
- a packet classifier for determining whether a received packet is a high priority packet;
- a transmission rate setting module configured to (a) increase a transmission rate value, which defines the maximum rate or maximum average rate at which the communication device should transmit the low priority packets, in response to determining or receiving an indication that a first set of one or more criteria is met and (b) decrease the transmission rate value in response to determining or receiving an indication that a second set of one or more criteria is met; and
- a packet transmitter configured to transmit low priority packets in accordance with the transmission rate value,
- wherein the transmission rate setting module is configured to determine whether the second set of criteria is met by determining whether a counter is equal to a threshold value or is greater than the threshold value, wherein the counter represents the number of high priority packets and/or bits received since a point in time; wherein:
- the transmission rate setting module is configured to set the transmission rate value to a first predetermined value in response to determining or receiving an indication that the counter is less than the threshold value;
- the transmission rate setting module is configured to increase the transmission rate value by a first predetermined amount in response to determining that (a) the transmission rate value can be increased by the first predetermined amount without violating a restriction and (b) the counter is less than the threshold value;
- the threshold value is a function of a guaranteed rate, associated with the high priority packets, and a margin value or a margin factor value; and
- the threshold value is equal to (a) the guaranteed rate minus the margin value, (b) the guaranteed rate divided by the margin factor value, or (c) the guaranteed rate multiplied by the margin factor value.

9. The communication device of claim 8, wherein the transmission rate setting module is configured to set the transmission rate value to a second predetermined value in response to determining that the counter is not less than the threshold value, and the first predetermined value is greater than the second predetermined value.

10. The communication device of claim 8, wherein the threshold value equals one.

11. The communication device of claim 8, wherein the transmission rate setting module is configured to decrease the transmission rate value by a second predetermined amount in response to determining that (a) the transmission rate value can be decreased by the second predetermined amount without violating a restriction and (b) the counter is greater than the threshold value.

12. The communication device of claim 11, wherein the first predetermined amount is less than the second predetermined amount.

13. The communication device of claim 8, wherein transmission rate setting module is configured to periodically determine whether the counter is less than a threshold value.

14. The communication device of claim 13, wherein the transmission rate setting module is configured to set the counter by counting the number of high priority packets and/or bits received between the point in time and another point in time, wherein the point in time and the another point in time define a window of time.

* * * * *